United States Patent [19]
Dornier

[11] Patent Number: 5,321,428
[45] Date of Patent: Jun. 14, 1994

[54] LASER PRINTER POWER SAVER

[75] Inventor: Pascal Dornier, Sunnyvale, Calif.

[73] Assignee: Cordata, Inc., Tortola, British Virgin Isls.

[21] Appl. No.: 940,688

[22] Filed: Sep. 4, 1992

[51] Int. Cl.$^5$ ............................................. G01D 15/10
[52] U.S. Cl. ............................... 346/76 PH; 219/216; 219/469; 219/497; 355/282; 355/285
[58] Field of Search ............... 364/557; 355/206, 204, 355/208, 209, 282, 285, 289, 290; 219/469, 470, 497, 492, 493, 216; 346/76 PH; 400/120

[56] References Cited
U.S. PATENT DOCUMENTS

| | | | |
|---|---|---|---|
| 4,652,892 | 3/1987 | Tanaka | 346/76 PH |
| 4,656,338 | 4/1987 | Yagasaki et al. | 219/497 |
| 4,704,618 | 11/1987 | Gotoh et al. | 346/76 PH |
| 4,897,668 | 1/1990 | Nagoto et al. | 346/76 PH |
| 5,040,022 | 8/1991 | Kinoshita et al. | 355/206 |

*Primary Examiner*—A. T. Grimley
*Assistant Examiner*—T. A. Dang
*Attorney, Agent, or Firm*—Donald R. Boys

[57] ABSTRACT

A system using a printer with a fuser-heater has control means for turning off the fuser-heater during times when no printing is required, while leaving the rest of the printing system operable. Time between print requests is monitored, and the fuser-heater is turned off when a preset time is reached without a print request. A next request turns the fuser-heater back on again. Data is accepted at a reduced rate while a heater warms up.

10 Claims, 3 Drawing Sheets

LASER PRINTER POWER SAVER

FIELD OF THE INVENTION

This invention is in the field of apparatus and methods for controlling a nonimpact laser printer or laser-type printer, and has particular application as a power saving device.

BACKGROUND OF THE INVENTION

As printing technology becomes more sophisticated and printers more capable of producing text and graphics with quality that is acceptable for almost any intended application, printers are becoming more available to all computer users. The most popular printer for its ease of use and quiet, dependable operation is the laser-type electrostatic printer, which produces a superior print quality and is faster and quieter than printer types that predate it, such as the dot matrix, daisy wheel, thermal, and ink-jet. For purposes of this specification printers that write on a drum by LED or LCD instead of a laser, and use a fuser-heater to fuse toner to the paper, are included as laser-type printers.

The laser-type printer uses a mechanism similar to that of a photocopy machine. The image is written on a photosensitive drum by a laser in the case of a laser printer. In other printers the image is written by an LED bar or an LCD shutter. Toner is attracted to the areas on the drum that have been written. The toner is then heated by the fuser-heater to fuse it to the paper to produce the printout. Because laser-type printers print an entire page at a time and the drum may be scanned quickly, they are much faster than most other printer types. Typically such a printer has an electronic buffer that can store a page or several pages of data depending on the amount of memory it has available for use. In a network comprising several computers and printers, printer buffers are inclined to be rather large and a network server, if present, usually means that a more than adequate amount of memory is available. A print request sent by a computer is received by the printer buffer and scheduled for printing, which typically commences when the buffer contains a full page and a "not busy" message is received from the printer. The process of printing is one of processing pages sent by the computer to the printer that are held in the printer's buffer. If the amount of material being sent to the printer is greater than the size of the buffer, the host computer is forced to hold until the buffer is cleared and can again accept print input, and so on until all pages are printed.

In a typical working environment, the printers are left on all the time as a convenience to users and are consequently consuming power in order to keep the fuser-heater at the proper operating temperature and the printer ready to print in response to instructions from a connected computer, i.e. a print request. The fuser-heater is the principal consumer of power in a laser-type printer and typically a fan for dissipating heat from the fuser-heater is the main source of noise. If a printer is allowed to run continually and no printing instructions are received, the fuser-heater will be kept at a certain set temperature, the fan will continue to operate to cool the rest of the printer, and the printer will be in a ready state. If the printer is turned off when not being used, it will require a certain amount of time to bring the fuser-heater up to a proper temperature and begin carrying out instructions from the computer when it is turned on again in response to a print command. The amount of time required for a fuser-heater to reach operating temperature is dependent on several factors that are unique to each printer. The wait that is necessarily involved is awkward and costly in a multi-user environment.

With several computers and one or more printers running in an enclosed area, there may be a heat build-up that must be eliminated through climate control equipment to maintain a successful operation. If the principle heat-producing element in a laser-type printer, the fuser-heater, could be turned off for times of non-use, this problem would be considerably reduced.

What is clearly needed is an automatic management system for shutting down a printer fuser-heater during periods of inactivity without disrupting operations, and that is compatible with existing systems.

SUMMARY OF THE INVENTION

In an embodiment of the invention a system for operating a printer having a fuser-heater is provided comprising a means for initializing the printer circuitry and the fuser-heater and readying the printer to accept requests and data to be printed, a means for transmitting the print request and data to the printer, and a means for determining when a print request is received whether the printer is initialized, and if it is, whether the fuser-heater is off, on and not at operating temperature, or on and at operating temperature. There is a means for turning the fuser-heater on in response to the conditions that a print request and data is received, the printer is initialized, and the fuser-heater is off.

In addition, there is a means for limiting the data acceptance rate to a rate less than the maximum data transmission rate in response to the condition that the printer is initialized and the fuser-heater is on but not at operating temperature, and accepting data at the maximum rate in response to the printer being initialized and the fuser-heater being on and at operating temperature.

There is also a means for measuring time in response to the condition that the printer is initialized, a print request and data has been received, and the fuser-heater is on and at operating temperature, the measured time reset to zero each time a print request is received. Finally there is a means for turning off the fuser-heater when the measured time reaches a preset maximum time without being reset to zero.

In some embodiments of the invention the maximum time after a print request before the fuser-heater is turned off is a variable that may be altered by the user.

The invention is useful in the event of a single printer operated by a single computer, or in network situations where several computers are connected to and sharing one or more printers. In one embodiment, the invention is implemented entirely integral to a printer with a fuser-heater. A method is provided for accomplishing the end of saving power by use of the invention.

The invention allows printing requirements to be carried out with a minimum power usage, and without disrupting printing operations.

DESCRIPTION OF THE PREFERRED EMBODIMENTS

Figure 1:
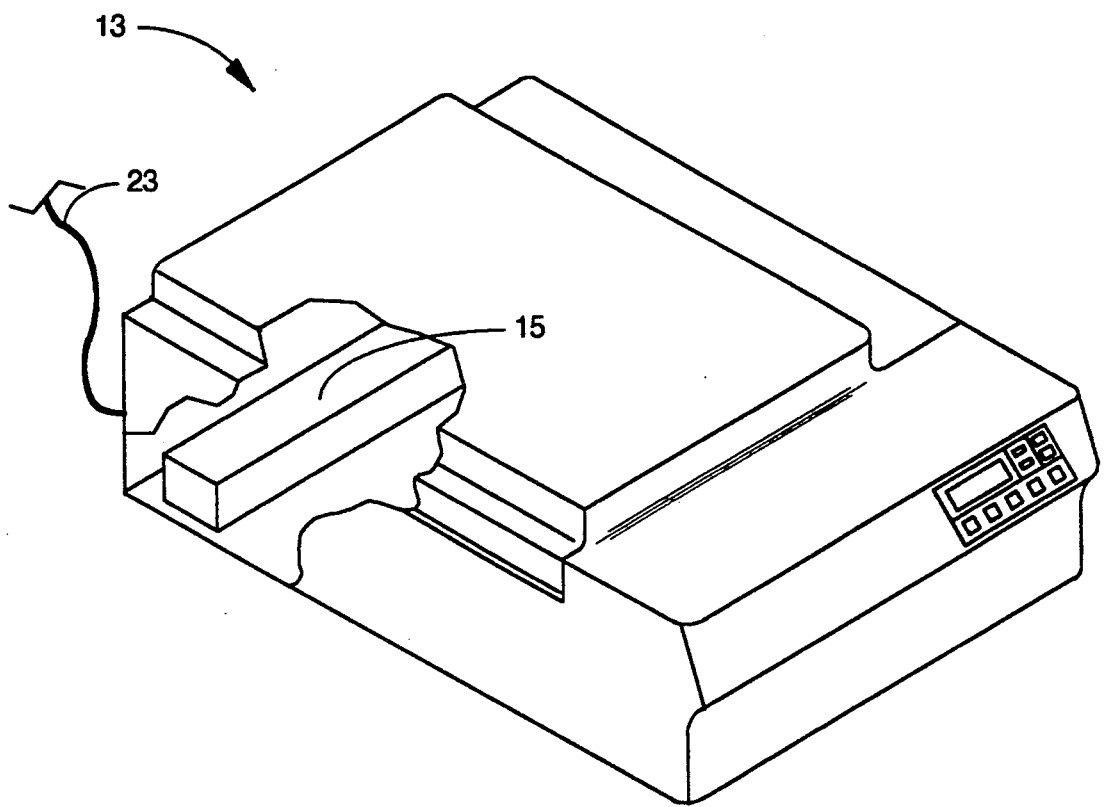
FIG. 1 is a view of a laser-type printer as used with the present invention.

FIG. 1 is an isometric drawing of a laser-type printer 13 operable according to the present invention, and which contains a fuser-heater 15, a drum, a fan, a buffer (not shown) and a cable connection 23 that joins the printer to a host computer or a to a network. The fuser-heater is responsible for heating the toner applied to the drum after an image has been written to the drum has written a page to be printed, to fuse the toner to the paper. Instructions sent by a computer what is written, and the entire process is managed by control routines. The fan (if used( in the printer is powered on at start up and is usually controlled by a heat-sensing mechanism that reacts to internal temperature and runs in reaction to cool mechanical and electronic elements of the printer. The majority of printers have a memory buffer that electronically stores composed pages transmitted by the control routines and sends the data to the processing unit of the printer as the printer is ready to accept it. When the buffer has emptied its contents to the printer and all instructions from the computer have been carried out, the printer waits for further input and maintains all of its components in a state of readiness. Actual operation can vary from printer to printer according to the type and speed of the printer and the size of the printer buffer.

Figure 2:
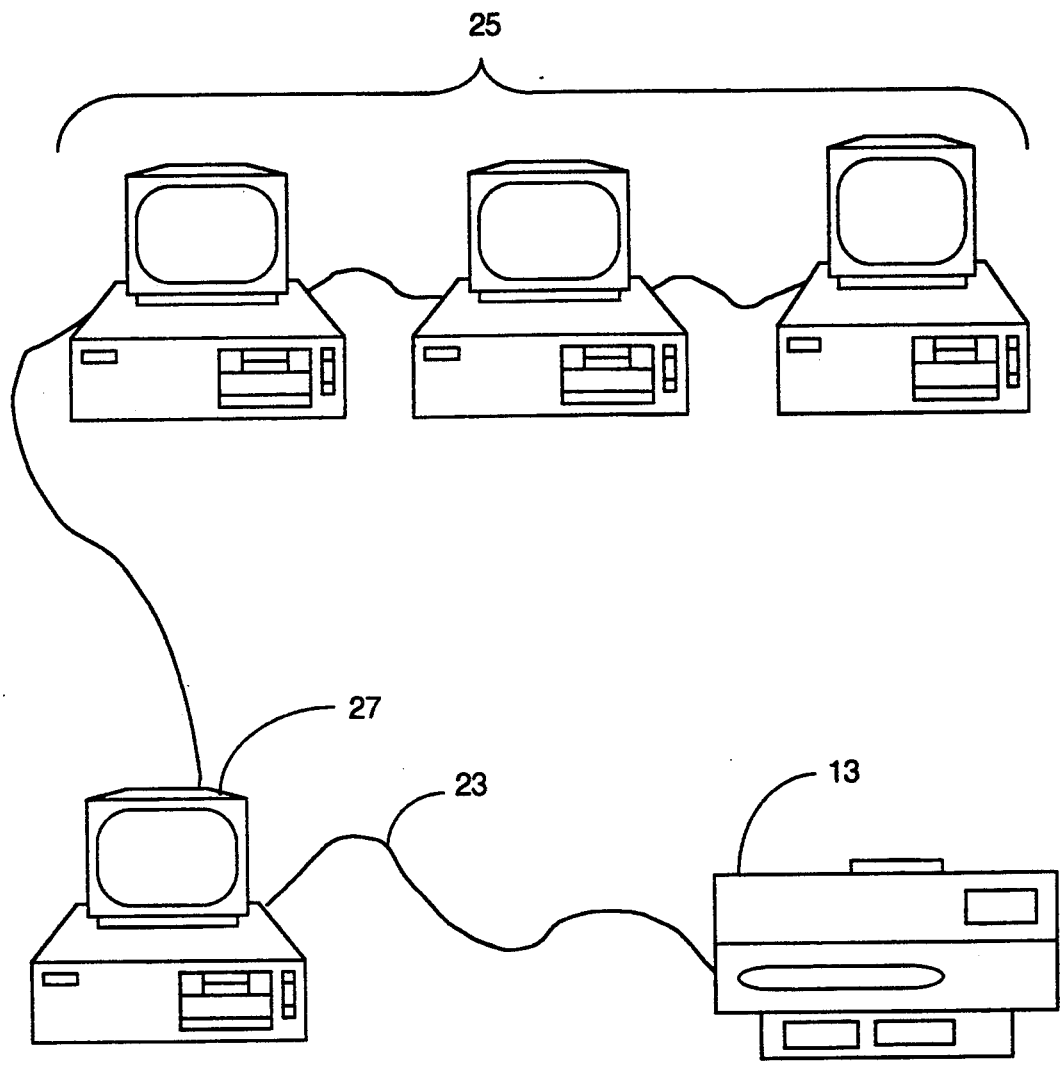
FIG. 2 is a drawing of a laser-type printer operated according to the present invention on a network with several computers.

It is not the intent of the present description to present a detailed description of laser-type printing, but rather to present an example of a relatively common printing function and demonstrate its functional components in the context of the present invention. The embodiment of the present invention as shown in FIG. 2 demonstrates laser-type printer 13 operating within a networked environment of other computers 25 and possibly other printers and with a network server computer 27. The present invention provides a means to keep the printer operating and prepared to print but to save power by turning off the fuser-heater portion of the laser-type printer. In response to a reduction in heat created by turning off the fuser-heater, the fan will shut down and run only infrequently, if at all, in response to ambient heat from other sources.

The connection to a computer or computers is never broken. The turning off of the fuser-heater significantly lessens power consumption and heat dissipation requirements.

Control routines that are a part of the invention can be installed on any computer that uses a printer that uses a fuser-heater or can be installed solely on network server, such as server 27 in FIG. 2, or may be installed preferably in the printer. The system of the invention comprises a means of turning off fuser-heater 15 (FIG. 1) in laser-type printer 13 after a set amount of time has passed without any input from the network server or from the connected computer or computers, and to turn it back on again when the connection is initialized (such as when a computer on the network is turned on) or a print request is sent from an attached network server or single computer. The printer stays on all the time, and only the fuser-heater element is turned off.

When the fuser-heater is turned back on after being powered down, it requires a certain amount of time to reach the correct operating temperature. During this time, the printer buffer is fully active and still accepts input but does so more slowly than usual until the fuser-heater is at operating temperature. This slower data acceptance rate avoids software timeouts, such as might occur when printing from DOS. A user will seldom notice slower operation and will not be aware that an element in the printer has been turned off or conversely, turned back on again. The system performs this function automatically. In a preferred mode of operation the reduced data acceptance rate is set to be equal to or smaller than the buffer size divided by the warm-up time. In some embodiments the control routines can further be manipulated to manually turn the fuser-heater on or off at any time.

Figure 3:
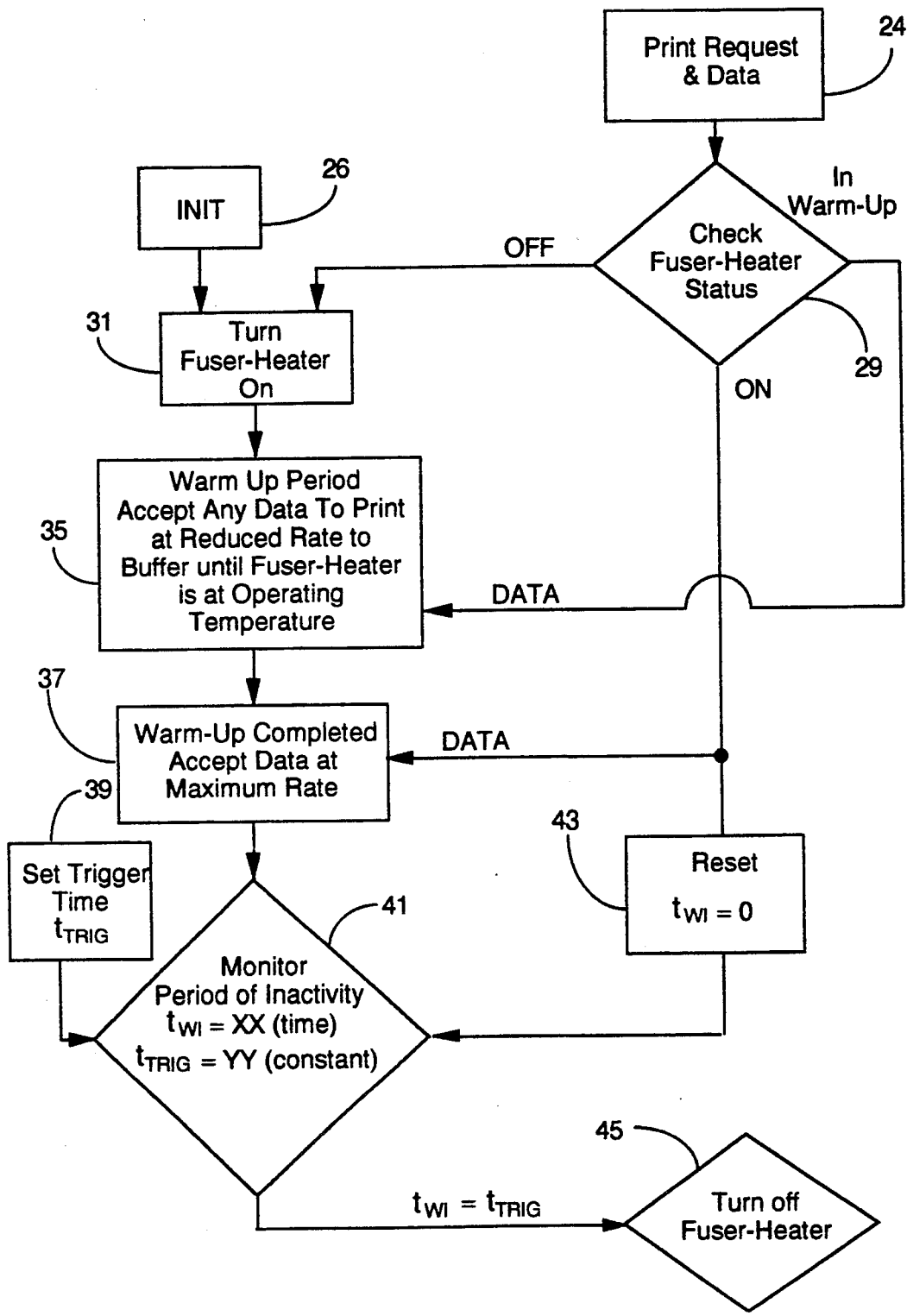
FIG. 3 is a flow chart of the printing process according to the present invention.

FIG. 3 is a flow diagram illustrating the operation of the present invention to control laser-type printer functions and thereby save power and decrease noise.

An INIT signal (point 26) is received from a host system when the system starts up, such as after an intentional downtime. INIT turns on fuser-heater 15 at point 31 as a consequence of turning on the printer itself. The INIT signal or similar signal is also received when a laser-type printer is turned on directly. After start-up, the system responds to print requests from the server 27 or any one of the computers 25 on the network (FIG. 2). The system receives a print request at point 24 and determines whether the fuser-heater is on, off, or in a warm-up mode (point 29).

If the fuser-heater is on and at operating temperature when a print request is received, data is accepted by the buffer at maximum rate (37). The rate for a particular printer buffer is unique to each laser-type printer.

The printer fuser-heater is managed by monitoring the time between print requests (41). This time is designated $t_{WI}$, for time without input, and is measured by a timer in the control circuitry. The timer is reset to zero (43) each time a print request is received and the printer is determined to be initialized and at operating temperature. A trigger time, $T_{TRIG}$, is set (39) for a maximum period between print requests, and the fuser-heater is shut off (45) when $t_{WI} = t_{TRIG}$. In some embodiments the trigger time may be set in the software and not accessible as a variable to a user.

If, when a print request is received, the fuser-heater is in a warm-up mode (35), data from a print request is accepted at a slower rate than the maximum data transfer rate available. Data is accepted at the maximum rate after the fuser-heater is at operating temperature. If when a print request is received the fuser-heater is off, the control system turns it on (31), putting the fuser-heater in warm-up mode, and the printer buffer accepts data more slowly until the fuser-heater is at operating temperature. The amount of time it takes for the fuser-heater to warm up is dependent upon the particular printer, and can vary.

Additional contributing factors to the length of warm-up time include the difference between a printer being powered on after an intentional downtime, in which the length of time it takes to warm up is naturally greater, and the case when a print request has been handled only moments before, requiring only a short warm-up.

In an alternative, and somewhat more sophisticated embodiment of the invention, there is more than one trigger time, and the fuser-heater is only partially shut down in some instances. For example, the control routines may be written and hardware included in a printer, so the fuser-heater, after a first period of 5 minutes, would be reduced to ⅔ power. If no print request is received after 30 minutes, the power would be reduced to ⅓, and if no request is received after 1 hour, the power would be shut off.

This embodiment addresses the possible reasons for no print requests. The 5 minute trigger addresses the ongoing situation that assumes that the users have only periodic need for the printer, and allows for rapid warm up when a new request is received. The 30 minute trigger anticipates situations like lunch time and shift change, and still allows for a shorter warm up than a complete shut down. The one hour trigger anticipates everyone has gone home for the day or the weekend, and shuts off the power completely.

In this embodiment, the times may be adjusted empirically to provide the minimum power usage for the demand pattern of a particular organization, and in other embodiments more or fewer trigger times might be useful.

It will be apparent to one with skill in the art that there are a number of changes that may be made to the embodiments of the invention described herein without departing from the spirit and scope of the invention is not limited to any particular computer, network server, or printer. Computers or printer with fuser-heaters of any manufacture can be used providing control routines are written in the languages that the computers and printers require. The present invention can also be used to control several printers that are connected together into a network, and still allow manual operation of any one of the printers. The invention is broadly applicable to any system using printers that have fuser-heaters. It is seen, then, that there are many alterations that may be made without departing from the spirit and scope of the invention.

What is claimed is:

1. A system for operating a printer having a fuser-heater comprising:
   means for initializing the printer by turning on the fuser-heater and printer circuitry, and readying the printer to accept print request and data;
   means for transmitting a print request and data to be printed to the printer;
   means for ascertaining, when a print request is received, whether the printer is initialized, and if it is, whether the fuser-heater is off, on but not at operating temperature, or on and at operating temperature;
   means for turning the fuser-heater on in response to the condition that a print request and data is received, the printer is initialized, and the fuser-heater is off;
   means for limiting the data acceptance rate at the printer to a rate less than the maximum rate in response to the printer being initialized and the fuser-heater being on and not at operating temperature, and accepting data at maximum rate in response to the printer being initialized and the fuser-heater being on and at operating temperature;
   means for measuring time in response to the condition that the printer is initialized, a print request and data is received, and the fuser-heater is on and at operating temperature, the measured time reset to zero each time a print request is received; and
   means for turning off the fuser-heater when the measured time reaches a preset maximum time without being reset to zero.

2. A system as in claim 1 further comprising user operable means for setting said preset maximum time.

3. A system as in claim 1 comprising a host computer connected to the printer by a data transmission link.

4. A system as in column 1 comprising a plurality of computers connected to one another and to at least one printer by a data transmission link operating on a network protocol.

5. A system as in claim 1 wherein said means for turning off the fuser-heater comprises means for reducing power to the fuser heater to specific power levels at specific measured times as well as turning off the fuser heater.

6. A printer comprising:
   a fuser-heater;
   means for initializing the printer in response to a remote signal by turning on the fuser-heater and printer circuitry, and readying the printer to accept print requests and data;
   means for ascertaining when a print request is received whether the printer is initialized, and if it is, whether the fuser-heater is off, on but not at operating temperature, or on and at operating temperature;
   means for turning the fuser-heater on in response to the conditions that a print request and data is received; the printer is initialized, and the fuser-heater is off:
   means for limiting the data acceptance rate at the printer to a rate less than the maximum rate in response to the printer being initialized and the fuser-heater being on and not at operating temperature, and accepting data at maximum rate in response to the printer being initialized and the fuser-heater being on and at operating temperature;
   means for measuring time in response to the condition that the printer is initialized, a print request and data is received, and the fuser-heater is on and at operating temperature, the measured time reset to zero each time a print request is received; and
   means for turning off the fuser-heater when the measured time reaches a preset maximum time without being reset to zero.

7. A printer as in claim 6 further comprising user-operable means for setting said preset maximum time.

8. A printer as in claim 6 wherein said means for turning off the fuser-heater comprises means for reducing power to the fuser heater to specific power levels at specific measured times as well as turning off the fuser heater.

9. A method for minimizing power use by an initialized printer having a fuser-heater comprising steps of:
   checking the status of the fuser-heater with each incoming print request as to whether the fuser-heater is off and the system is initialized, the fuser-heater is on and at operating temperature, or the fuser-heater is on and not at operating temperature;
   turning the fuser-heater on in response to the conditions that a print request and data is received, the printer is initialized, and the fuser-heater is off;
   limiting the data acceptance rate at the printer to a rate less than the maximum rate in response to the printer being initialized and the fuser-heater being on and not at operating temperature, and accepting data at maximum rate in response to the printer being initialized and the fuser-heater being on and at operating temperature;

measuring time in response to the condition that the printer is initialized, a print request and data is received, and the fuser-heater is on and at operating temperature, the measured time reset to zero each time a print request is received; and turning off the fuser-heater when the measured time reaches a preset maximum time without being reset to zero.

10. The method of claim 9 further comprising steps for reducing power to the fuser heater to specific power levels at specific measured times as well as for turning off the fuser heater.

* * * * *